US012634400B2

(12) United States Patent
Morsey et al.

(10) Patent No.: US 12,634,400 B2
(45) Date of Patent: May 19, 2026

(54) SELECTIVELY MERGING SUBSCRIPTIONS TO PERFORMANCE INDICATOR INFORMATION

(71) Applicant: Dell Products, L.P., Round Rock, TX (US)

(72) Inventors: Amr Morsey, New Cairo (EG); Mohamed Shaaban, New Cairo (EG); Sara Nasr, Cairo (EG); Ahmed Hossam Abdelfattah, 6 October (EG)

(73) Assignee: Dell Products L.P., Round Rock, TX (US)

( * ) Notice: Subject to any disclaimer, the term of this patent is extended or adjusted under 35 U.S.C. 154(b) by 290 days.

(21) Appl. No.: 18/487,712

(22) Filed: Oct. 16, 2023

(65) Prior Publication Data

US 2025/0126212 A1      Apr. 17, 2025

(51) Int. Cl.
H04M 15/00          (2024.01)
H04L 43/0811        (2022.01)

(52) U.S. Cl.
CPC ....... H04M 15/765 (2013.01); H04L 43/0811 (2013.01); H04M 15/715 (2013.01)

(58) Field of Classification Search
CPC .............. H04M 15/765; H04M 15/715; H04L 43/0811
See application file for complete search history.

(56) References Cited

U.S. PATENT DOCUMENTS

| | | | |
|---|---|---|---|
| 2015/0281004 A1* | 10/2015 | Kakadia .............. | H04L 41/5009 370/235 |
| 2016/0212758 A1* | 7/2016 | Leung ............... | H04W 72/0473 |
| 2016/0261981 A1* | 9/2016 | Kaufman ............. | H04W 4/029 |
| 2017/0012833 A1* | 1/2017 | Kumar ............... | H04L 41/5019 |
| 2021/0204154 A1* | 7/2021 | Li ........................... | H04L 41/40 |
| 2021/0377804 A1* | 12/2021 | Sivaraj ................. | H04W 76/15 |
| 2022/0345887 A1* | 10/2022 | Karampatsis ......... | H04L 67/306 |
| 2022/0382299 A1* | 12/2022 | Shamasundar ........ | G05D 1/101 |
| 2023/0224752 A1* | 7/2023 | Huang .................. | H04W 24/10 370/252 |
| 2024/0179647 A1* | 5/2024 | Qiao ................... | H04W 56/001 |
| 2024/0243984 A1* | 7/2024 | Soldati .................... | H04L 43/08 |
| 2024/0292204 A1* | 8/2024 | Kuravangi-Thammaiah ............... H04W 8/18 |
| 2024/0422077 A1* | 12/2024 | Gad ....................... | H04W 24/10 |
| 2024/0430164 A1* | 12/2024 | Gad ...................... | H04W 24/02 |

* cited by examiner

*Primary Examiner* — Matthew D. Anderson
*Assistant Examiner* — Michele C Douglas
(74) *Attorney, Agent, or Firm* — Amin, Turocy & Watson, LLP

(57)          ABSTRACT
The technologies described herein are generally directed toward selectively merging subscriptions to performance indicator information. In an embodiment, a method can include receiving, from an extended application device, a first request for a subscription to be enabled to receive a first set of performance indicator information applicable to a network, wherein the controller device is associated with the network. The method can further include comparing the first request to an established subscription to receive a second set of network performance indicator information applicable to the network, resulting in a comparison result. Further, the method can include communicating a second request that was generated based on the comparison result.

18 Claims, 11 Drawing Sheets

100

Near Real-Time RIC 205 xApp
210A xApp
210B xApp
210C

Database
230

Subscription manager
240

E2
INTERFACE
260

RU
260

DU
270

CU
275

RAN 280

700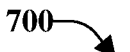

702 —

RECEIVING, FROM AN EXTENDED APPLICATION DEVICE, A FIRST REQUEST FOR A SUBSCRIPTION TO BE ENABLED TO RECEIVE A FIRST SET OF PERFORMANCE INDICATOR INFORMATION APPLICABLE TO A NETWORK, WHEREIN THE CONTROLLER DEVICE IS ASSOCIATED WITH THE NETWORK

704 —

COMPARING THE FIRST REQUEST TO AN ESTABLISHED SUBSCRIPTION TO RECEIVE A SECOND SET OF NETWORK PERFORMANCE INDICATOR INFORMATION APPLICABLE TO THE NETWORK, RESULTING IN A COMPARISON RESULT

706 —

COMMUNICATING A SECOND REQUEST THAT WAS GENERATED BASED ON THE COMPARISON RESULT

FIG. 7

800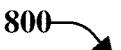

802

RECEIVING, FROM AN EXTENDED APPLICATION DEVICE, A FIRST REQUEST FOR A SUBSCRIPTION TO BE ENABLED TO RECEIVE A FIRST SET OF PERFORMANCE INDICATOR INFORMATION APPLICABLE TO A NETWORK, WHEREIN THE CONTROLLER DEVICE IS ASSOCIATED WITH THE NETWORK

RECEIVING COMPONENT 122

804

COMPARING THE FIRST REQUEST TO AN ESTABLISHED SUBSCRIPTION TO RECEIVE A SECOND SET OF NETWORK PERFORMANCE INDICATOR INFORMATION APPLICABLE TO THE NETWORK, RESULTING IN A COMPARISON RESULT

COMPARING COMPONENT 124

806

COMMUNICATING A SECOND REQUEST THAT WAS GENERATED BASED ON THE COMPARISON RESULT

COMMUNICATING COMPONENT 126

FIG. 8

900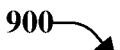

OPERATION 902

RECEIVING, FROM AN EXTENDED APPLICATION DEVICE, A
FIRST REQUEST FOR A SUBSCRIPTION TO BE ENABLED TO RECEIVE A
FIRST SET OF PERFORMANCE INDICATOR INFORMATION APPLICABLE
TO A NETWORK, WHEREIN THE CONTROLLER DEVICE IS ASSOCIATED
WITH THE NETWORK

OPERATION 904

COMPARING THE FIRST REQUEST TO AN ESTABLISHED
SUBSCRIPTION TO RECEIVE A SECOND SET OF NETWORK
PERFORMANCE INDICATOR INFORMATION APPLICABLE TO THE
NETWORK, RESULTING IN A COMPARISON RESULT

OPERATION 906

COMMUNICATING A SECOND REQUEST THAT WAS
GENERATED BASED ON THE COMPARISON RESULT

NON-TRANSITORY MACHINE-READABLE MEDIUM 810

FIG. 9

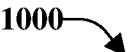
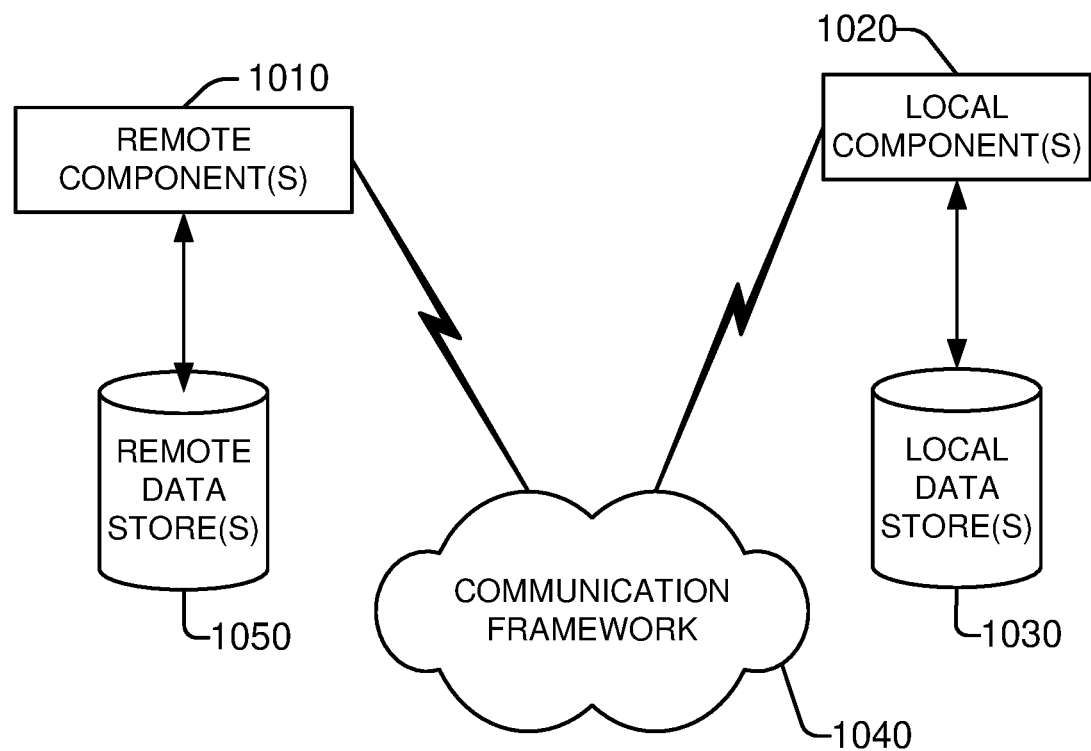
FIG. 10

SELECTIVELY MERGING SUBSCRIPTIONS TO PERFORMANCE INDICATOR INFORMATION

BACKGROUND

Modern radio access networks can generate and utilize a variety of different performance indicators that can be used by many different types of connecting devices. One type of equipment that can subscribe to selected performance indictors is extended application equipment.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can include a processor and a memory that stores executable instructions that, when executed by the processor, facilitate performance of operations. The instructions can include an instruction to generate a requesting component that can request, from a controller device, a subscription to an indicator producing device, to receive a first set of performance indicator information corresponding to a network. The instructions can further include an instruction to generate a first receiving component that can receive an indication that the subscription was converted into a second subscription to the network device, wherein the second subscription was generated based on a result of a comparison of the subscription to an existing subscription to receive a second set of network performance indicator information corresponding to the network. The instructions can further include an instruction to generate a second receiving component that can receive a response to reception of the indication that the first subscription was converted to the second subscription that can include the first set of performance indicator information.

Additionally, or alternatively, the result can include that the first set of performance indicator information corresponds to the second set of performance indicator information, and wherein the second subscription is based on a merger of the subscription and the existing subscription. Additionally, or alternatively, the result can include that the first set of performance indicator information corresponds to a superset of the second set of performance indicator information and additional performance indicator information, and wherein the second subscription is based on a cancellation of the existing subscription.

Additionally, or alternatively, the result can include that the first set of performance indicator information corresponds to a subset of the second set of performance indicator information, and wherein the first subscription was converted to the second subscription by generating a subset indication based on results of the existing subscription received by the controller device from the indicator producing device.

An example method can include receiving, from an extended application device, a first request for a subscription to be enabled to receive a first set of performance indicator information applicable to a network, wherein the controller device is associated with the network. The method can further include comparing the first request to an established subscription to receive a second set of network performance indicator information applicable to the network, resulting in a comparison result. Further, the method can include communicating a second request that was generated based on the comparison result.

Additionally, or alternatively, the comparison result can include an indication that the first set of performance indicator information corresponds to the second set of performance indicator information, and wherein communicating the second request can include communicating, to a database associated with the controller device, the second request to merge the subscription and the established subscription. Additionally, or alternatively, the method can further include receiving, by the controller device from an indicator generating device, indicator information corresponding to the established subscription, and communicating, by the controller device, the indicator information to the extended application device.

Additionally, or alternatively, the comparison result can include an indication that the first set of performance indicator information corresponds to a superset of the second set of performance indicator information and additional performance indicator information, and communicating the second request can include communicating, to an indicator generating device, the second request to cancel the established subscription, that can result in a canceled subscription, and requesting a new subscription to receive the superset of the second set of performance indicator information and the additional performance indicator information.

Additionally, or alternatively, the extended application device can include a first extended application device, wherein the established subscription is associated with a second extended application device, and the method further can include receiving, by the controller device, from the indicator generating device, indicator information corresponding to the superset of the new subscription, generating, by the controller device, subset information corresponding to the second set of performance indicator information of the canceled subscription, and communicating, by the controller device, the subset information to the second extended application device.

Additionally, or alternatively, the indicator generating device can include an E2 node device, and the second request can be communicated to the E2 node device via an E2 interface of the E2 node device. Additionally, or alternatively, the network can include a radio access network, and the controller device can include a radio access network intelligent controller device. Additionally, or alternatively, the comparison result can include an indication that the first set of performance indicator information corresponds to a subset of the second set of performance indicator information, and communicating the second request can include communicating, to a database associated with the controller device, the second request to generate a subset indication from indicator information received based on the established subscription, wherein the subset indication corresponds to the subset of the second set of performance indicator information, and the method can further can include communicating, by the controller device, the subset indication to the extended application device in response to receive the first request.

Additionally, or alternatively, the performance indicator information can include key performing indicator information generated by the network and provided to consumer devices to increase a defined connectivity metric associated with the network. Additionally, or alternatively, comparing the first request to the established subscription can include comparing binary forms of the first request and the established subscription.

An example non-transitory computer-readable medium can include instructions that, in response to execution, cause a system including a processor to perform operations. These operations can include receiving, from an extended application device, a first request for a subscription to be enabled to receive a first set of performance indicator information applicable to a network, wherein the controller device is associated with the network. The operations can further include comparing the first request to an established subscription to receive a second set of network performance indicator information applicable to the network, resulting in a comparison result. The operations can further include communicating a second request that was generated based on the comparison result.

Additionally, or alternatively, the extended application device can include a first extended application device, wherein the previously enabled subscription is associated with a second extended application device, and the operations can further include, receiving, from the indicator generating device, indicator information corresponding to the superset of the new subscription, generating subset information corresponding to the second set of performance indicator information of the canceled subscription, and communicating the subset information to the second extended application device.

Additionally, or alternatively, the comparison result can include information representing that the first set of performance indicator information corresponds to a subset of the second set of performance indicator information, communicating the second request can include communicating, to a data store accessible by the network equipment, the second request to generate a subset indication from indicator information received based on the previously enabled subscription, the subset indication corresponds to the subset of the second set of performance indicator information, and the operations can further include communicating the subset indication to the extended application device in response to receive the first request. Additionally, or alternatively, comparing the first request to the previously enabled subscription can include comparing binary forms of the first request and the previously enabled subscription.

Other embodiments may become apparent from the following detailed description when taken in conjunction with the drawings.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which.

4

Figure 3:
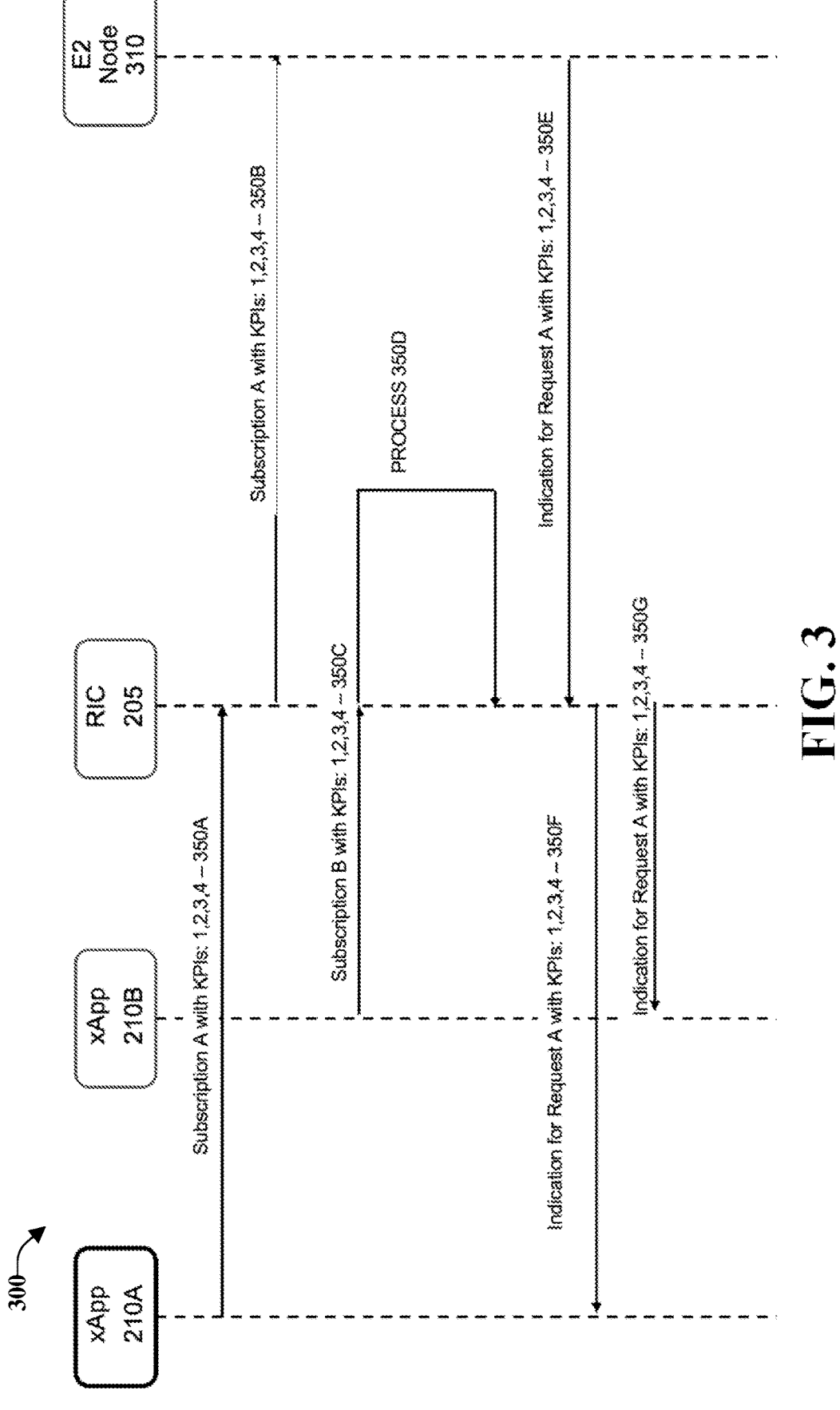

FIG. 3 is a sequence diagram of an example system that can facilitate selectively merging subscriptions to performance indicator information, in accordance with one or more embodiments.

Figure 4:
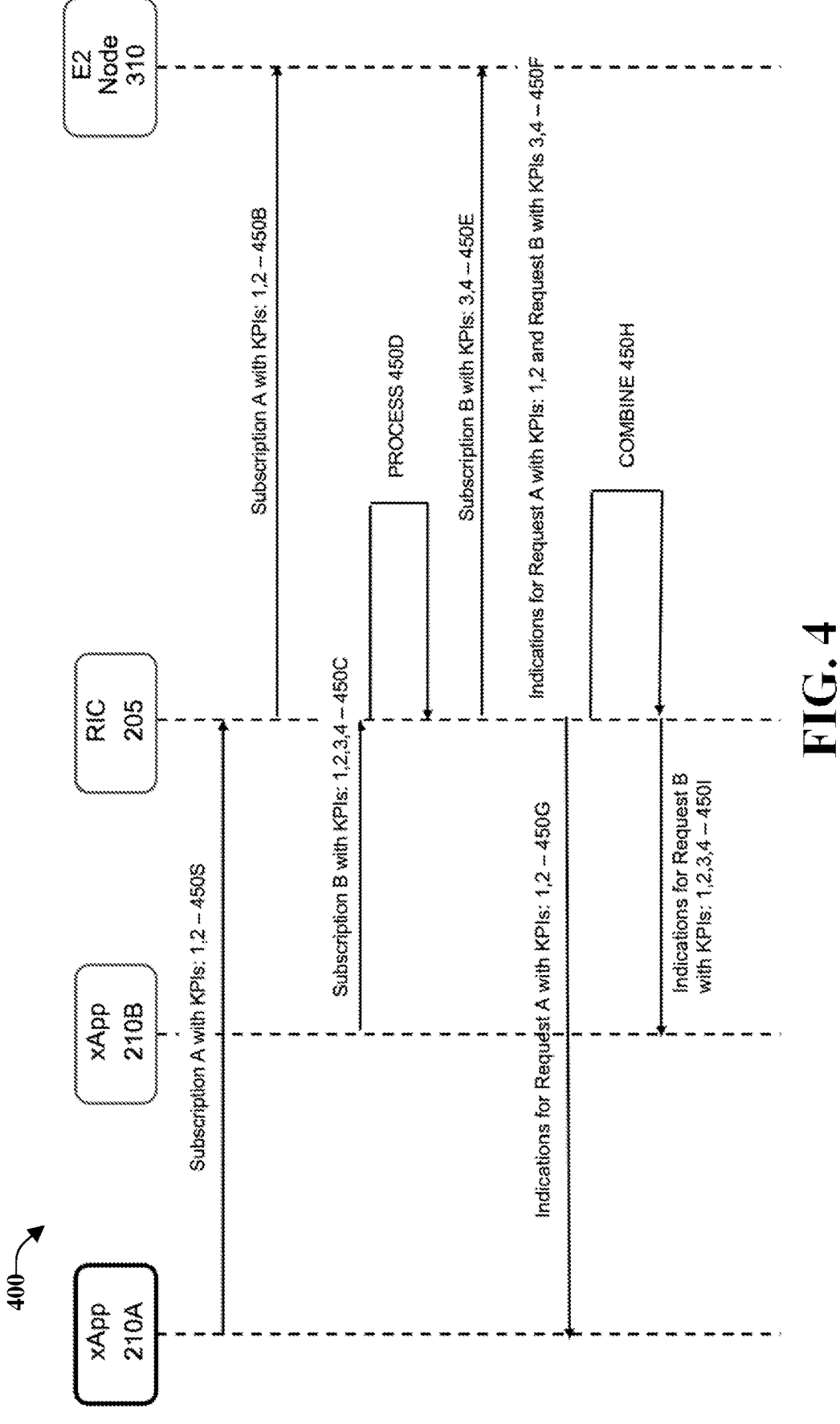

FIG. 4 is a sequence diagram of an example system that can facilitate selectively merging subscriptions to performance indicator information, in accordance with one or more embodiments.

Figure 5:
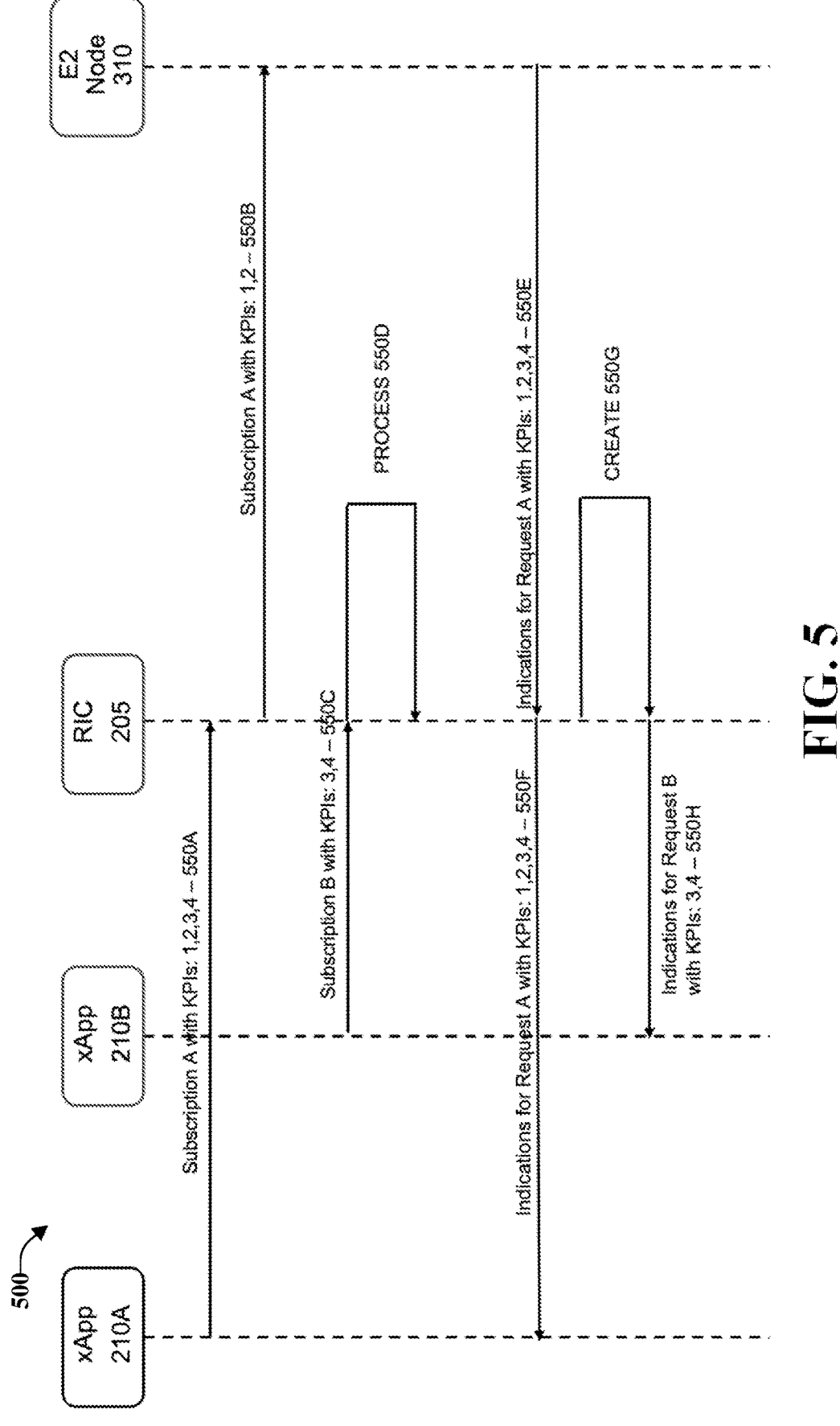

FIG. 5 is a sequence diagram of an example system that can facilitate selectively merging subscriptions to performance indicator information, in accordance with one or more embodiments.

Figure 6:
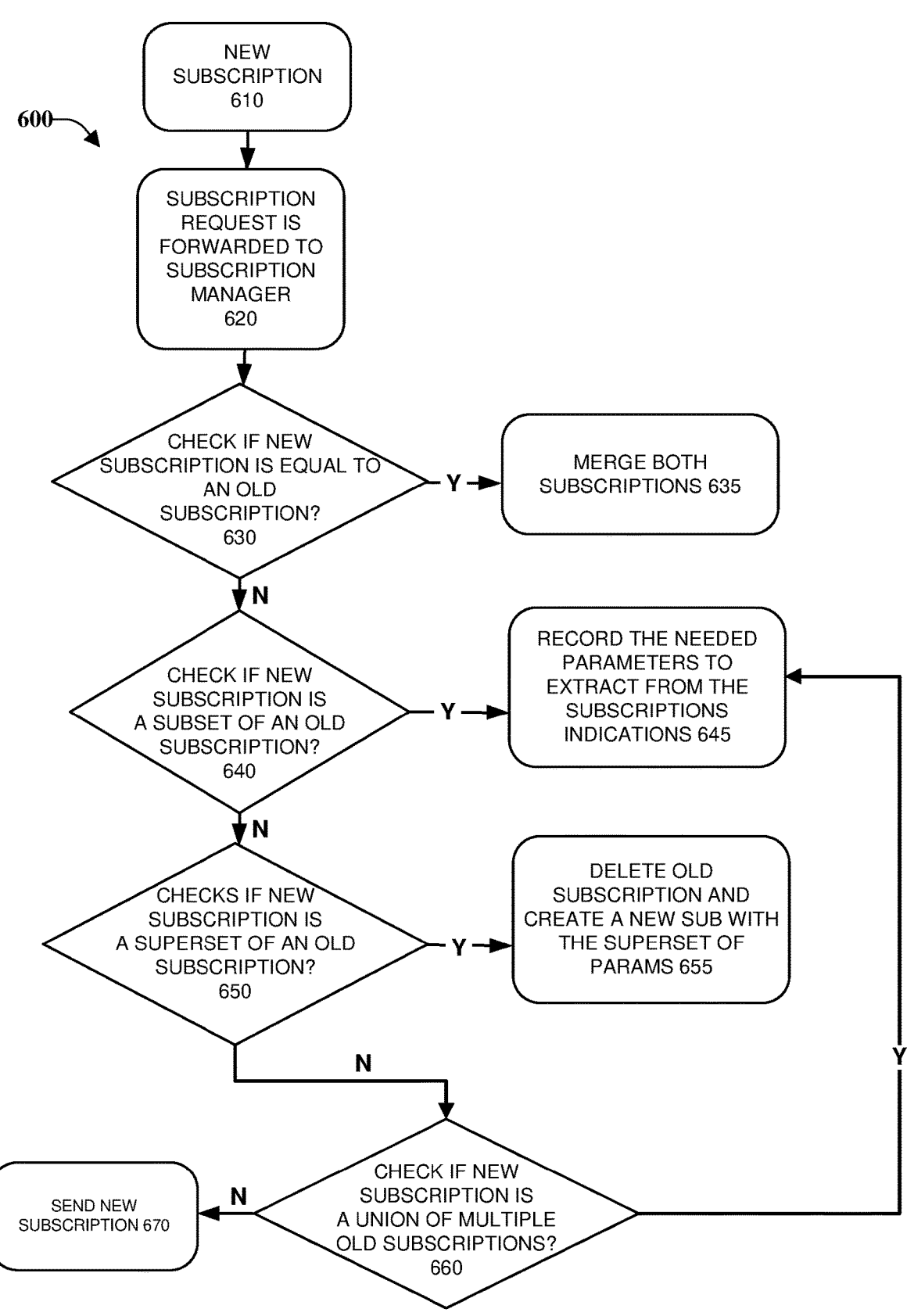

FIG. 6 depicts a flow diagram representing example operations of an example process that can facilitate selectively merging subscriptions to performance indicator information, in accordance with one or more embodiments.

FIG. 7 depicts a flow diagram representing example operations of an example method that can facilitate selectively merging subscriptions to performance indicator information, in accordance with one or more embodiments.

FIG. 8 depicts an example system that can facilitate selectively merging subscriptions to performance indicator information, in accordance with one or more embodiments.

FIG. 9 depicts an example non-transitory machine-readable medium that can include executable instructions that, when executed by a processor of a system, can facilitate selectively merging subscriptions to performance indicator information, in accordance with one or more embodiments.

FIG. 10 depicts an example schematic block diagram of a computing environment with which the disclosed subject matter can interact, in accordance with one or more embodiments.

Figure 11:
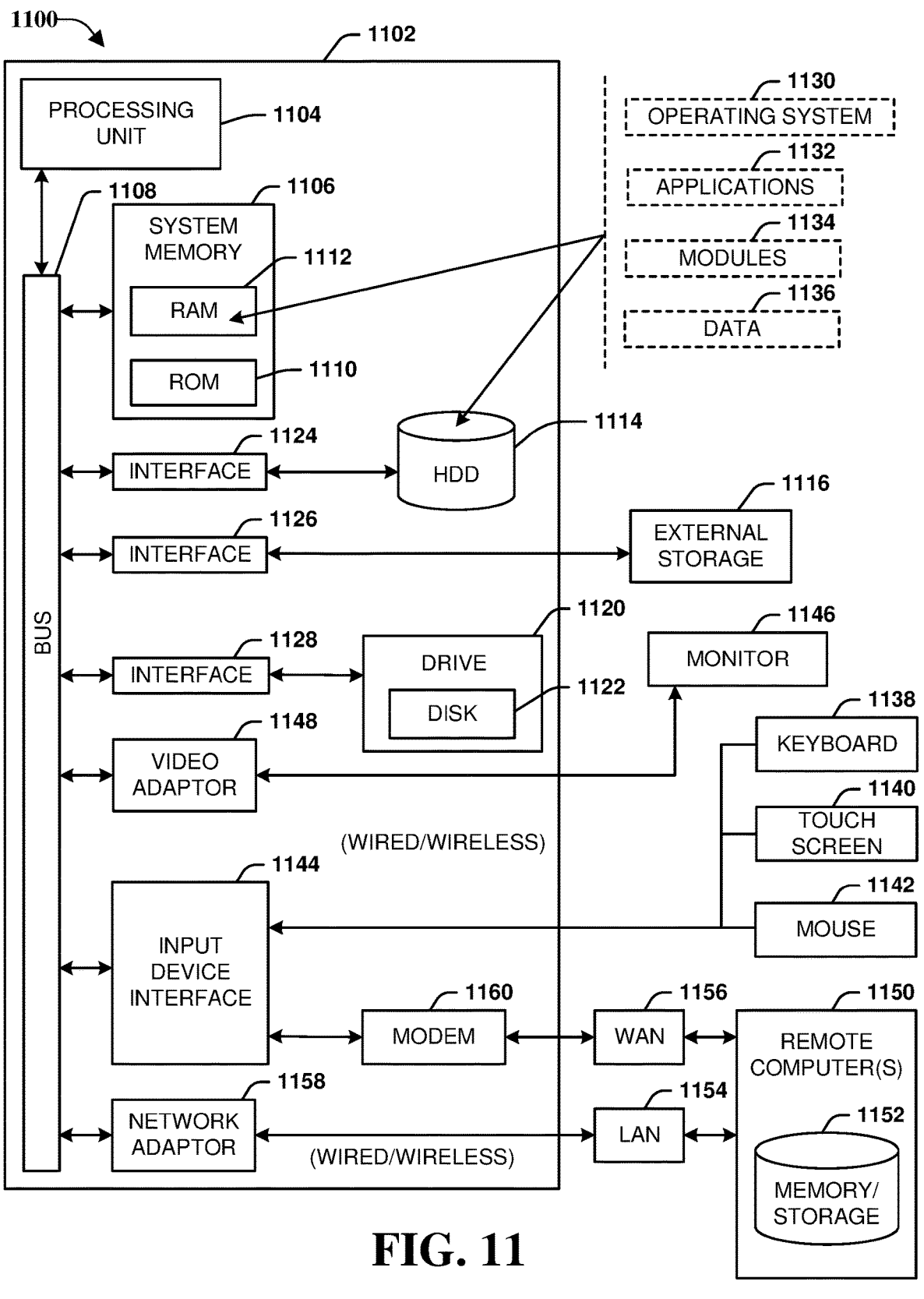

FIG. 11 illustrates an example block diagram of a computer operable to execute an embodiment of this disclosure.

DETAILED DESCRIPTION

Generally speaking, one or more embodiments described herein can facilitate selectively merging subscriptions to performance indicator information. As is understood by one having skill in the relevant art(s), given the description herein, the implementation(s) described herein are non-limiting examples, and variations to the technology can be implemented. For instance, even though many examples described herein discuss cloud storage devices, the technologies described herein can be used in many applicable circumstances, e.g., for different types of subscriptions to different provided results. As such, any of the embodiments, aspects, concepts, structures, functionalities, implementations and/or examples described herein are non-limiting, and the technologies described and suggested herein can be used in various ways that provide benefits and advantages to data manipulation system technology in general, both for existing technologies and technologies in this and similar areas that are yet to be developed.

Aspects of the subject disclosure will now be described more fully hereinafter with reference to the accompanying drawings in which example components, graphs and operations are shown. In the following description, for purposes of explanation, numerous specific details are set forth in order to provide a thorough understanding of the various embodiments. However, the subject disclosure may be embodied in many different forms and should not be construed as limited to the examples set forth herein.

Figure 1:
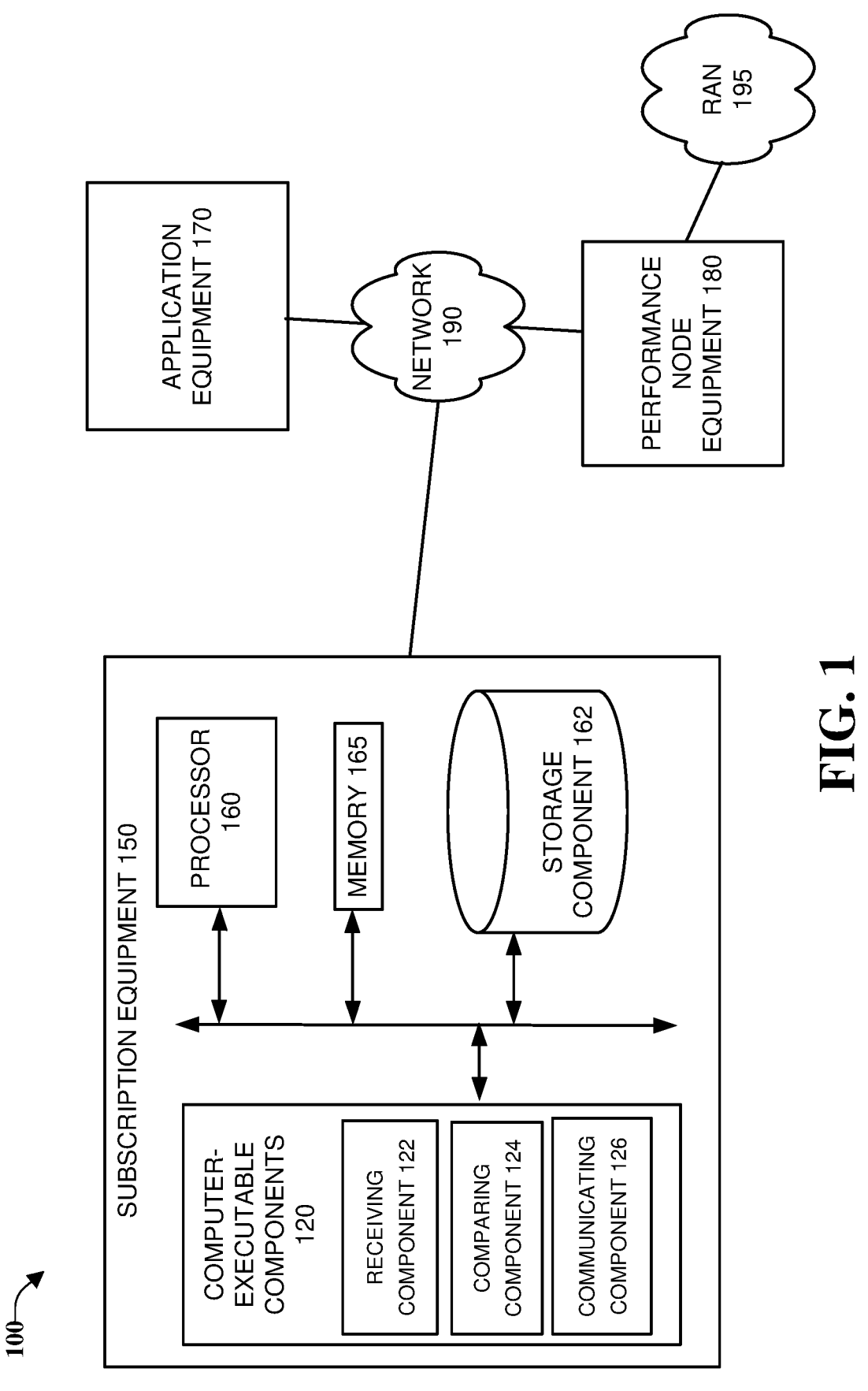
FIG. 1 is an architecture diagram of an example system that can facilitate selectively merging subscriptions to performance indicator information, in accordance with one or more embodiments.

FIG. 1 is an architecture diagram of an example system 100 that can facilitate selectively merging subscriptions to performance indicator information, in accordance with one or more embodiments. For purposes of brevity, description of like elements and/or processes employed in other embodiments is omitted. As depicted, system 100 includes subscription equipment 150 connected to application equipment 170 and performance node equipment 180 via network 190. As depicted performance node equipment 180 is further connected to radio access network 195.

As depicted subscription equipment 150 includes memory 165, processor 160, and storage component 162. According to multiple embodiments, memory 165 of subscription equipment 150 can store one or more computer and/or machine readable, writable, and/or executable components 120 and/or instructions. In one or more embodiments, computer-executable components 120, when executed by processor 160, can facilitate performance of operations defined by the executable component(s) and/or instruction(s). Computer executable components 120 can include receiving component 122, comparing component 124, communicating component 126, and other components described or suggested by different embodiments described herein, that can improve the operation of system 100 or other systems described herein.

According to multiple embodiments, processor 160 can comprise one or more processors and/or electronic circuitry that can implement one or more computer and/or machine readable, writable, and/or executable components and/or instructions that can be stored on memory 165. For example, processor 160 can perform various operations that can be specified by such computer and/or machine readable, writable, and/or executable components and/or instructions including, but not limited to logic, control, input/output (I/O), arithmetic, and/or the like. In some embodiments, processor 160 can comprise one or more components including, but not limited to, a central processing unit, a multi-core processor, a microprocessor, dual microprocessors, a microcontroller, a System on a Chip (SOC), an array processor, a vector processor, and other types of processors. Further examples of processor 160 are described below with reference to processing unit 1104 of FIG. 11. Such examples of processor 160 can be employed to implement any embodiments of the subject disclosure.

As discussed further with FIG. 11 below, network 190 can employ various wired and wireless networking technologies. For example, embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), fifth generation core (5G Core), fifth generation option 3× (5G Option 3×), high speed packet access (HSPA), Z-Wave, Zigbee and other 802.XX wireless technologies and/or legacy telecommunication technologies.

In some embodiments, memory 165 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 165 are described below with reference to system memory 1106 and FIG. 11. Such examples of memory 165 can be employed to implement any embodiments of the subject disclosure. In some embodiments, memory 165 can comprise non-volatile random-access memory (NVRAM).

It is understood that the computer processing systems, computer-implemented methods, apparatus, and computer program products described herein employ computer hardware and/or software to solve problems that are highly technical in nature (e.g., recording and manipulating complex subscription information for frequently updated, complex performance indications), that are not abstract and cannot be performed as a set of mental acts by a human. For example, a human, or even a plurality of humans, cannot efficiently handle the complex, rapid storage of streaming data according to cloud storage provider requirements.

In one or more embodiments, computer executable components 120 can be used in connection with implementing one or more of the systems, devices, components, and/or computer-implemented operations shown and described in connection with FIG. 1 or other figures disclosed herein. In an example, memory 165 can store executable instructions that can facilitate generation of receiving component 122, which can in some implementations receive, from an extended application device, a first request for a subscription to be enabled to receive a first set of performance indicator information applicable to a network, wherein the controller device is associated with the network. For example, one or more embodiments, receiving component 122 can receive, from an extended application device (e.g., application equipment 170), a first request for a subscription to be enabled to receive a first set of performance indicator information applicable to a network (e.g., RAN 195), wherein the controller device can be associated with the network.

In another example, memory 165 can store executable instructions that can facilitate generation of comparing component 124, which can, in some implementations compare the first request to an established subscription to receive a second set of network performance indicator information applicable to the network, resulting in a comparison result. For example, one or more embodiments, comparing component 124 can compare the first request to an established subscription to receive a second set of network performance indicator information applicable to the network, resulting in a comparison result.

In another example, memory 165 can store executable instructions that can facilitate generation of communicating component 126, which can, in some implementations communicate a second request that was generated based on the comparison result. For example, one or more embodiments, communicating component 126 can communicate a second request that was generated based on the comparison result.

It is appreciated that the embodiments of the subject disclosure depicted in various figures disclosed herein are for illustration only, and as such, the architecture of such embodiments are not limited to the systems, devices, and/or components depicted therein. For example, in some embodiments, subscription equipment 150 can further comprise various computer and/or computing-based elements described herein with reference to operating environment 1100 and FIG. 11. In one or more embodiments, such computer and/or computing-based elements can be used in connection with implementing one or more of the systems, devices, components, and/or computer-implemented operations shown and described in connection with FIG. 1 or other figures disclosed herein.

It should be noted that subscription equipment 150, and other equipment discussed herein, can execute code instructions that may operate on servers or systems, remote data centers, or 'on-box' in individual client information handling systems, according to various embodiments herein. In some embodiments, it is understood any or all implementations of one or more embodiments described herein can operate on a plurality of computers, collectively referred to as subscription equipment 150. For example, one or more of subscription equipment 150, and other equipment discussed herein can all be separate subsystems running in the kernel of a computing device as well as operating on separate network equipment, e.g., as depicted in FIG. 1.

Figure 2:
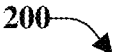
FIG. 2 is an architecture diagram of an example system that can facilitate selectively merging subscriptions to performance indicator information, in accordance with one or more embodiments.

FIG. 2 is an architecture diagram of an example system 200 that can facilitate selectively merging subscriptions to performance indicator information, in accordance with one or more embodiments. For purposes of brevity, description of like elements and/or processes employed in other embodiments is omitted. As depicted, system 200 includes near real-time (NRT) RAN intelligent controller (RIC) 205 communicatively coupled to RAN 280 via E2 interface 260. In the example depicted, NRT RIC 205 includes database 230 and extended applications (xApps) 210A-C coupled to subscription manager 240. In an implementation, functions described above with reference to subscription equipment 150 can be performed by subscription manager 240 operated by NRT RIC 205.

As depicted, RAN 280 includes radio unit (RU) 260, distributed unit (DU) 270, and central unit (CU) 275. In one or more embodiments, RU 260 can handle the digital front end (DFE) of RAN 280 as well as some parts of the physical (PHY) layer of RAN 280. In one or more embodiments, DU 270 can be operated relatively close to RU 260, and can run the radio link control (RLC) layer, media access control (MAC) layer, and parts of the PHY layer. In one or more embodiments, CU 276 can run the radio resource control (RRC) layer, and the packet data convergence protocol (PDCP) layer.

In one or more embodiments, E2 interface 260 can connect the RIC 205 and E2 nodes (e.g., discussed with FIG. 3 below), and can facilitate the exposure of selected E2 node data (e.g., network measurements, context information, etc.) to RIC 205. In some implementations, E2 subscription services can include reporting services, e.g., RIC 250 can use a RIC subscription procedure to request that an E2 Node sends a report message RIC 205 after each occurrence of a defined event trigger, e.g., a request for particular performance indicators. In one or more embodiments, an example RIC subscription procedure can be used to establish E2 subscriptions on E2 node that includes an event trigger and a sequence of actions. An example subscription request can include a RAN Function ID, RIC Request ID, RIC subscription details:

E2 subscription services can include inserting services, e.g., RIC 205 can use a RIC subscription procedure to request that an E2 Node send an insert message to NRT-RIC after each occurrence of and suspends the associated procedure in E2 Node a defined event trigger. E2 subscription services can include policy services, e.g., RIC 205 can request that an E2 node execute a specific policy during the functioning of the E2 node, e.g., after each occurrence of a defined event trigger.

As discussed with FIGS. 3-6 below, the elements described in FIG. 2 above can be used in different types of circumstances where subscriptions to different services can be selectively merged.

FIG. 3 is a sequence diagram of an example system 300 that can facilitate selectively merging subscriptions to performance indicator information, in accordance with one or more embodiments. For purposes of brevity, description of like elements and/or processes employed in other embodiments is omitted. As depicted, system 300 includes a sequence of blocks 350A-G describing communications between and processing by, xApps 210A-B. RIC 205, and E2 node 310.

At block 350A, a subscription A is received by RIC 205 from xApp 210A, that includes a request for KPIs 1-4. At 350B, subscription A is communicated by RIC 205 to E2 node 310. At block 350C, a subscription B is received by RIC 205 from xApp 210B, that includes a request for KPIs 1-4. At 350D, subscription B is processed by comparing subscription B to existing subscriptions that have been submitted by RIC 205 to E2 node 310. It should be noted that, based on processing block 350D, subscription B was not sent to e2 node 310 by RIC 205, e.g., because the same request for information was in subscription A, and performance indications for KPIs 1-4 will be provided via E2 node 310 in response to subscription A.

At 350E, based on subscription A, RIC 205 receives performance indications for KPIs 1, 2, 3, and 4 from E2 node 310, and at block 350F RIC 205 provides the performance indications received based on subscription A. In an example implementation depicted, at block 350G, the response to subscription B is provided, e.g., based on subscriptions A and B being for the same KPIs 1-4. In one or more embodiments, subscriptions can be termed as being merged.

FIG. 4 is a sequence diagram of an example system 400 that can facilitate selectively merging subscriptions to performance indicator information, in accordance with one or more embodiments. For purposes of brevity, description of like elements and/or processes employed in other embodiments is omitted. As depicted, system 400 includes a sequence of blocks 450A-I describing communications between and processing by xApps 210A-B. RIC 205, and E2 node 310.

At block 450A, a subscription A is received by RIC 205 from xApp 210A, that includes a request for KPIs 1-2. At 450B, subscription A is communicated by RIC 205 to E2 node 310. At block 450C, a subscription B is received by RIC 205 from xApp 210B, that includes a request for KPIs 1-4. At 450D, subscription B was processed by comparing subscription B to existing subscriptions that have been submitted by RIC 205 to E2 node 310, e.g., subscription A.

Based on subscription B including a request for KPIs 1-4 at block 450C, at block 450E, subscription B can be modified and sent to E2 node 310 by one or more embodiments, modified to include a subscription request for KPIs 3-4, e.g., not repeating the request for KPIs 1-2 of subscription A.

At 450F, based on subscriptions A-B. RIC 205 receives separate performance indications for KPIs 1-2 and KPIs 3-4. At 450G, in response to subscription A, performance indications for KPIs 1-2 are communicated to xApp 210A. At block 450H, performance indications for KPIs 1-2 and KPIs 3-4 are combined, and in response to subscription B, at block 450I, the combined indications for KPIs 1-2 and KPIs 3-4 are forwarded to xApp 210B.

FIG. 5 is a sequence diagram of an example system 500 that can facilitate selectively merging subscriptions to performance indicator information, in accordance with one or more embodiments. For purposes of brevity, description of like elements and/or processes employed in other embodiments is omitted. As depicted, system 500 includes a sequence of blocks 550A-H describing communications between and processing by, xApps 210A-B. RIC 205, and E2 node 310.

At block 550A, a subscription A is received by RIC 205 from xApp 210A, that includes a request for KPIs 1-4. At

550B, subscription A for KPIs 1-4 is communicated by RIC 205 to E2 node 310. At block 550C, a subscription B is received by RIC 205 from xApp 210B, that includes a request for KPIs 3-4. At 350D, subscription B is processed by comparing subscription B to existing subscriptions that have been submitted by RIC 205 to E2 node 310. It should be noted that, based on processing block 350D, subscription B was not sent to e2 node 310 by RIC 205, e.g., because the same request for information was in subscription A, and performance indications for KPIs 1-4 will be provided via E2 node 310 in response to subscription A.

Based on subscription A including a request for KPIs 1-4 at block 550A, at block 550E, indications for KPIs 1-4 will be provided via E2 node 310 in response to subscription A, and at 550F, these indications for KPIs 1-4 can be provided to xApp 210A. At block 550G, based on the indications for KPIs 1-4, the indications for KPIs 3-4 can be extracted and a new indication can be created for KPIs 3-4 and provided to xApp 210B at block 550H.

FIG. 6 depicts a flow diagram representing example operations of an example process 600 that can facilitate selectively merging subscriptions to performance indicator information, in accordance with one or more embodiments. For purposes of brevity, description of like elements and/or processes employed in other embodiments is omitted. As depicted, system 500 includes a sequence of blocks 610-670 describing communications between and processing by, xApps 210A-B, RIC 205, and E2 node 310.

At 610, this example assumes that existing subscriptions are stored in database 230 for reference, and at 620, a request for a new subscription A is received from application equipment 170 by subscription manager 240, e.g., implemented by receiving component 122 of subscription equipment 150. At 630, subscription A has the same parameters requested as an existing subscription and, upon receiving the new subscription, the subscription manager 240 can check database 230 to determine whether there is an existing subscription that is equivalent. At 635, based on this equivalence, both subscription requests can be merged (e.g., by comparing component 124) in database 230, and a record can be generated that marks that both requesting xApps 210A-B can be forwarded the same indication based on the subscription requests. In this example, the new subscription is not communicated to E2 node 310 by communicating component 126.

At 640, subscription manager 240 can determine that example new subscription A has parameters that are a subset of the parameters of an existing subscription. Based on the existing subscription, the parameters of the new subscription request can be stored in database 230 as being linked to the requesting xApp 210B. No new subscription is communicated to E2 node 230. Upon receiving an indication for that subscription, the subscription manager 240 240 can extract, at 645, the required parameters and communicate a new subset indication with the required parameters to satisfy the respective subscriptions.

At 650, subscription manager 240 can determine that example new subscription A has parameters that are a super set of the parameters of an existing subscription. Based on this determination, subscription manager 240 can generate and send a delete subscription message to E2 node 310 with the existing subscription, and a new subscription request with the new super set request can be forwarded to E2 node 310. Alternatively, subscription manager 240 can generate and communicate a subscription modification message to the E2 node 310 with new parameters associated with the superset subscription request. In this example, upon receiving an indication for the new subscription, subscription manager 240 can construct a new subset indication with the required parameters and send it to the old xApp, while the new xApp will get the full indication.

At 660, subscription manager 240 can determine that new subscription A has parameters that are a union of multiple existing subscriptions stored in database 230. In this example, the parameters requested by the new subscription can be recorded from the existing subscriptions and link them to the xApp. Upon receiving indications from these subscriptions, the subscription manager 240 can construct a new indication with the required parameters from all the other indications and communicate the new indication to the requesting xApp.

FIG. 7 depicts a flow diagram representing example operations of an example method 700 that can facilitate selectively merging subscriptions to performance indicator information, in accordance with one or more embodiments. For purposes of brevity, description of like elements and/or processes employed in other embodiments is omitted.

In some examples, one or more embodiments of method 700 can be implemented by receiving component 122, comparing component 124, communicating component 126, and other components that can be used to implement aspects of method 700, in accordance with one or more embodiments. It is appreciated that the operating procedures of method 700 are example operating procedures, and that there can be embodiments that implement more or fewer operating procedures than are depicted, or that implement the depicted operating procedures in a different order than as depicted.

At 702 of method 700, receiving component 122 can, in one or more embodiments include receiving, from an extended application device, a first request for a subscription to be enabled to receive a first set of performance indicator information applicable to a network, wherein the controller device is associated with the network. At 704 of method 700, comparing component 124 can, in one or more embodiments include comparing the first request to an established subscription to receive a second set of network performance indicator information applicable to the network, resulting in a comparison result. At 706 of method 700, communicating component 126 can, in one or more embodiments include communicating a second request that was generated based on the comparison result.

FIG. 8 depicts an example system 800 that can facilitate selectively merging subscriptions to performance indicator information, in accordance with one or more embodiments. For purposes of brevity, description of like elements and/or processes employed in other embodiments is omitted. Example system 800 can include receiving component 122, comparing component 124, communicating component 126, and other components that can be used to implement aspects of system 800, as described herein, in accordance with one or more embodiments.

At 802 of FIG. 8, receiving component 122 can receive, from an extended application device, a first request for a subscription to be enabled to receive a first set of performance indicator information applicable to a network, wherein the controller device is associated with the network, in accordance with one or more embodiments. At 804 of FIG. 8, comparing component 124 can compare the first request to an established subscription to receive a second set of network performance indicator information applicable to the network, resulting in a comparison result. At 806 of FIG.

8, communicating component 126 can communicate a second request that was generated based on the comparison result.

FIG. 9 depicts an example 900 non-transitory machine-readable medium 910 that can include executable instructions that, when executed by a processor of a system, can facilitate selectively merging subscriptions to performance indicator information, in accordance with one or more embodiments. For purposes of brevity, description of like elements and/or processes employed in other embodiments is omitted.

Operation 902 of FIG. 9 can facilitate generation of receiving component 122 which, in one or more embodiments, can receive, from an extended application device, a first request for a subscription to be enabled to receive a first set of performance indicator information applicable to a network, wherein the controller device is associated with the network. Operation 904 of FIG. 9 can facilitate generation of comparing component 124, which, in one or more embodiments, can compare the first request to an established subscription to receive a second set of network performance indicator information applicable to the network, resulting in a comparison result. Operation 906 of FIG. 9 can facilitate generation of communicating component 126 which, in one or more embodiments can communicate a second request that was generated based on the comparison result.

FIG. 10 is a schematic block diagram of a system 1000 with which the disclosed subject matter can interact, in accordance with one or more embodiments. The system 1000 comprises one or more remote component(s) 1010. The remote component(s) 1010 can be hardware and/or software (e.g., threads, processes, computing devices). In some embodiments, remote component(s) 1010 can be a distributed computer system, connected to a local automatic scaling component and/or programs that use the resources of a distributed computer system, via communication framework 1040. Communication framework 1040 can comprise wired network devices, wireless network devices, mobile devices, wearable devices, radio access network devices, gateway devices, femtocell devices, servers, etc.

The system 1000 also comprises one or more local component(s) 1020. The local component(s) 1020 can be hardware and/or software (e.g., threads, processes, computing devices).

One possible communication between a remote component(s) 1010 and a local component(s) 1020 can be in the form of a data packet adapted to be transmitted between two or more computer processes. Another possible communication between a remote component(s) 1010 and a local component(s) 1020 can be in the form of circuit-switched data adapted to be transmitted between two or more computer processes in radio time slots. The system 1000 comprises a communication framework 1040 that can be employed to facilitate communications between the remote component(s) 1010 and the local component(s) 1020, and can comprise an air interface, e.g., Uu interface of a UMTS network, via a long-term evolution (LTE) network, etc. Remote component(s) 1010 can be operably connected to one or more remote data store(s) 1050, such as a hard drive, solid state drive, SIM card, device memory, etc., that can be employed to store information on the remote component(s) 1010 side of communication framework 1040. Similarly, local component(s) 1020 can be operably connected to one or more local data store(s) 1030, that can be employed to store information on the local component(s) 1020 side of communication framework 1040.

In order to provide a context for the various aspects of the disclosed subject matter, the following discussion is intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

In the subject specification, terms such as "store," "storage," "data store," "data storage," "database," and substantially any other information storage component relevant to operation and functionality of a component, refer to "memory components," or entities embodied in a "memory" or components comprising the memory. It is noted that the memory components described herein can be either volatile memory or non-volatile memory, or can comprise both volatile and non-volatile memory, for example, by way of illustration, and not limitation, volatile memory 1020, non-volatile memory 1022, disk storage 1024, and memory storage, e.g., local data store(s) 1030 and remote data store(s) 1050, for which further description is set forth below.

For instance, non-volatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random-access memory, dynamic random-access memory, synchronous dynamic random-access memory, double data rate synchronous dynamic random-access memory, enhanced synchronous dynamic random-access memory, SynchLink dynamic random-access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

Referring now to FIG. 11, in order to provide additional context for various embodiments described herein, FIG. 11 and the following discussion are intended to provide a brief, general description of a suitable computing environment 1100 in which the various embodiments described herein can be implemented.

While the embodiments have been described above in the general context of computer-executable instructions that can run on one or more computers, those skilled in the art will recognize that the embodiments can be also implemented in combination with other program modules and/or as a combination of hardware and software. For purposes of brevity, description of like elements and/or processes employed in other embodiments is omitted.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and non-volatile media, removable and non-removable media. By way of example, and not limitation, computer-readable storage media or machine-readable storage media can be implemented in connection with any method or technology for storage of information such as computer-readable or machine-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory, or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries, or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments of the aspects described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid-state drive (SSD) could be used in addition to, or in place of, an HDD 1114. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide non-volatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/ wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are examples and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches, and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations," this could include the processor performing the operations directly and/or facilitating, directing, or cooperating with another device or component to perform the operations.

In the subject specification, terms such as "datastore," data storage," "database," "cache," and substantially any other information storage component relevant to operation and functionality of a component, refer to "memory components," or entities embodied in a "memory" or components comprising the memory. As mentioned above, it will be appreciated that the memory components, or computer-readable storage media, described herein can be either volatile memory or non-volatile storage, or can include both volatile and non-volatile storage. By way of illustration, and not limitation, non-volatile storage can include ROM, programmable ROM (PROM), EPROM, EEPROM, or flash memory. Volatile memory can include RAM, which acts as external cache memory. By way of illustration and not limitation, RAM can be available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "network device," "access point (AP)," "base station," "NodeB," "evolved Node B (eNodeB)," "home Node B (HNB)," "home access point (HAP)," "cell device," "sector," "cell," and the like, are utilized interchangeably in the subject application, and refer to a wireless network component or appliance that can serve and receive data, control, voice, video, sound, gaming, or substantially any data-stream or signaling-stream to and from a set of subscriber stations or provider enabled devices. Data and signaling streams can include packetized or frame-based flows.

Additionally, the terms "core-network," "core," "core carrier network," "carrier-side," or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. User equipment does not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g., call transfer) or implicitly (e.g., call waiting). It is to be noted that service "execution" may or may not be a core network functionality as third-party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method, comprising:
   receiving, by a controller device comprising a processor, from a first extended application device, a first request for a subscription to receive a first set of performance indicator information applicable to a network, wherein the controller device is associated with the network,
   comparing, by the controller device, the first request to an established subscription with a second extended application device to receive a second set of network performance indicator information applicable to the network, resulting in a comparison result, and
   communicating, by the controller device, a second request, to an indicator generating device, that was generated based on the comparison result, wherein the comparison result comprises an indication that the first set of performance indicator information corresponds to a superset of the second set of performance indicator information and additional performance indicator information, and wherein the communicating of the second request comprises communicating the second request to:
      cancel the established subscription, resulting in a canceled subscription, and
      request a new subscription to receive a first set of performance indicator information; and
   receiving, by the controller device, from the indicator generating device, indicator information corresponding to the first set of performance indicator information of the new subscription;
   generating, by the controller device, subset information corresponding to the second set of performance indicator information of the canceled subscription; and
   communicating, by the controller device, the subset information to the second extended application device.

2. The method of claim 1, wherein the second request comprises a request to merge the subscription and the established subscription.

3. The method of claim 2, further comprising:
   communicating, by the controller device, the indicator information to the first extended application device.

4. The method of claim 1, wherein the indicator generating device comprises an E2 node device, and wherein the second request is communicated to the E2 node device via an E2 interface of the E2 node device.

5. The method of claim 1, wherein the network comprises a radio access network, and wherein the controller device comprises a radio access network intelligent controller device.

6. The method of claim 1, wherein the communicating of the second request further comprises communicating, to a database associated with the controller device, the second request to generate a subset indication corresponding to the second set of performance indicator information of the canceled subscription, and wherein the generating of the subset information corresponding to the second set of performance indicator information of the canceled subscription resulted from subset indication being retrieved from the database.

7. The method of claim 1, wherein performance indicator information comprises key performance indicator information generated by the network and provided to consumer devices to increase a defined connectivity metric associated with the network.

8. The method of claim 1, wherein the comparing of the first request to the established subscription comprises comparing binary forms of the first request and the established subscription.

9. A network device, comprising
a processor; and
a memory that stores executable components that, when executed by the processor, facilitate performance of operations, comprising:
   a requesting component that communicates a request to a controller device, to establish a subscription to an indicator producing device, to receive a first set of performance indicator information corresponding to a network, and
   a receiving component that receives an indication that the subscription was established, wherein the subscription was established based on:
      a result of a comparison by the controller device of the first set of performance indicator information to a second set of performance indicator information of an existing subscription, wherein the result comprises that the first set of performance indicator information corresponds to a superset of the second set of performance indicator information and additional performance indicator information, and
      the existing subscription being canceled.

10. The network device of claim 9, wherein the result comprises that the first set of performance indicator information corresponds to the second set of performance indicator information.

11. A non-transitory machine-readable medium, comprising executable instructions that, when executed by a processor of radio access network intelligent controller equipment, facilitate performance of operations, comprising:
   receiving, from an extended application device, a first request for a subscription to receive a first set of performance indicator information of a network, wherein the network equipment is part of the network, comparing the first request to a previously enabled subscription to receive a second set of network performance indicator information, resulting in a comparison result, wherein the comparison result comprises information representing that the first set of performance indicator information corresponds to a superset of the second set of performance indicator information and additional performance indicator information, and
based on the comparison result, communicating a second request to an E2 node device, that cause the E2 node device to perform actions comprising:
   canceling the previously enabled subscription, and
   establishing the subscription in accordance with the first request.

12. The non-transitory machine-readable medium of claim 11, wherein the extended application device comprises a first extended application device, wherein the previously enabled subscription is associated with a second extended application device, and wherein the operations further comprise:
   receiving, from the E2 node device, indicator information corresponding to the superset of the new subscription;
   identifying subset information corresponding to the second set of performance indicator information of the canceled subscription; and
   communicating the subset information to the second extended application device.

13. The non-transitory machine-readable medium of claim 11, wherein comparing the first request to the previously enabled subscription comprises comparing binary forms of the first request and the previously enabled subscription.

14. The non-transitory machine-readable medium of claim 11, wherein the network was organized in accordance with an open radio access network architecture, and wherein the E2 node device comprises at least one of a radio unit, a central unit, or a distributed unit.

15. The non-transitory machine-readable medium of claim 11, wherein performance indicator information comprises key performance indicator information collected by the E2 node device and provided to the radio access network intelligent controller equipment.

16. The non-transitory machine-readable medium of claim 11, wherein the comparing of the first request to the previously enabled subscription comprises comparing binary forms of the first request and the previously enabled subscription.

17. The network device of claim 9, wherein the controller device comprises a radio access network controller, and wherein the network was organized in accordance with an open radio access network architecture.

18. The method of claim 1, wherein the indicator generating device comprises at least one of a radio unit, a central unit, or a distributed unit, wherein the network was organized in accordance with an open radio access network architecture, and wherein the controller device comprises a radio access network controller.

* * * * *